April 7, 1953   J. T. L. BROWN   2,634,028
MERCURY DISPENSER
Filed Dec. 31, 1947
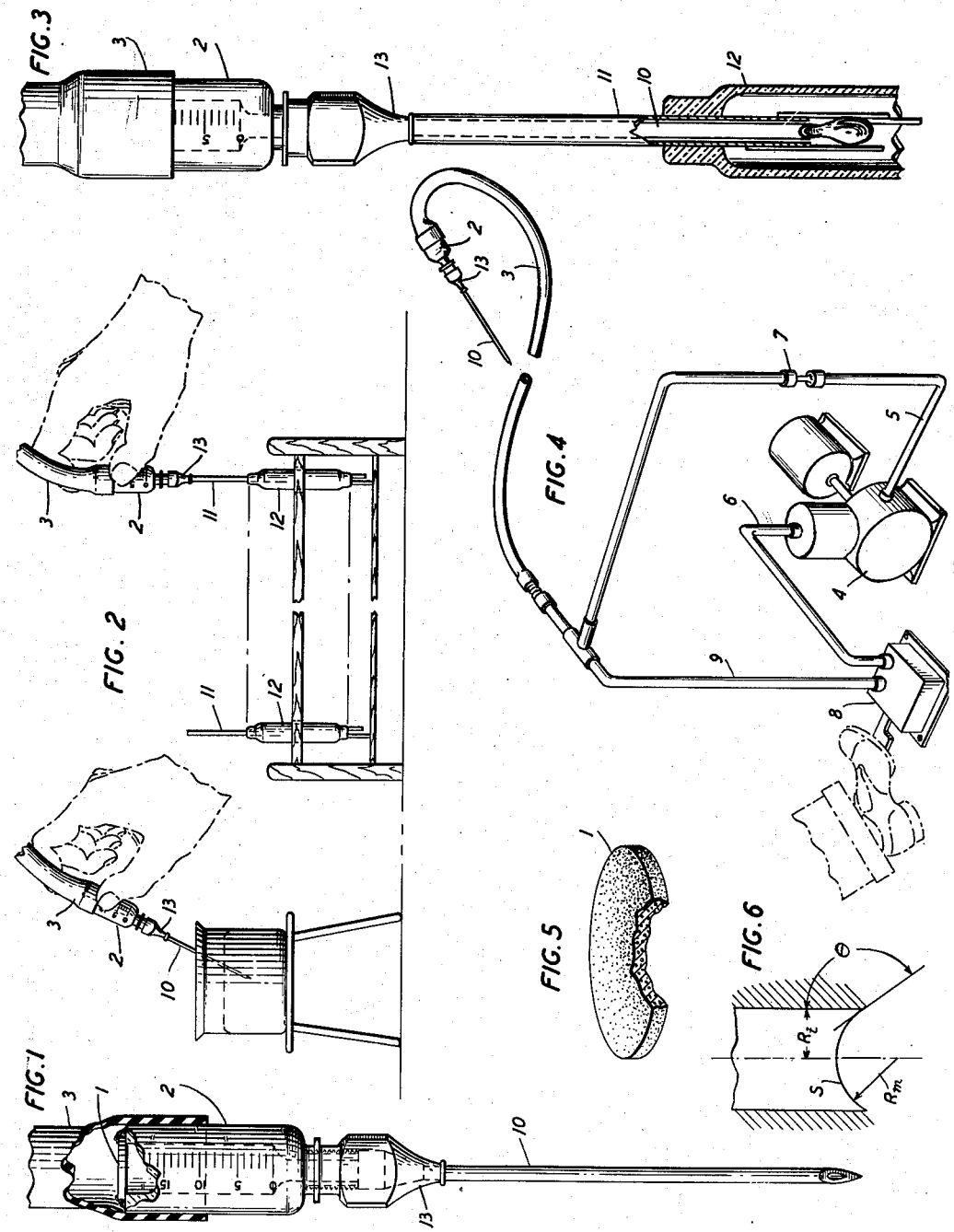
INVENTOR
J.T.L.BROWN
BY
ATTORNEY Patented Apr. 7, 1953

2,634,028

UNITED STATES PATENT OFFICE 2,634,028

MERCURY DISPENSER

John T. L. Brown, Short Hills, N. J., assignor to Bell Telephone Laboratories, Incorporated, New York, N. Y., a corporation of New York Application December 31, 1947, Serial No. 795,027

2 Claims. (Cl. 222—189)

This invention relates to measuring devices and particularly to means for extracting from a reservoir a precise amount of a liquid without resorting to delicate adjustments or requiring skill in the handling of instruments.

The object of the invention is to provide means whereby mass production operatives may measure a precise amount of liquid, transport it to a given point and deposit it without loss. The efficient and proper operation of mercury contact relays has been found to depend greatly on the amount of mercury sealed therein and it has further been found that in the mass production of such relays the comparatively unskilled operatives employed cannot be trusted to introduce a uniform and specified amount of mercury into each contact device where the measurement of quantity depends on visual adjustment of liquid level in a measuring container or "graduate." This is particularly true where the liquid has a surface tension to produce a meniscus of such definite form as that of mercury. It is, therefore, necessary to supply each such operative with a tool capable of automatically extracting from a reservoir of mercury a very precise amount and to guard this against loss until properly deposited within the sealed envelope of the relay.

In accordance with this invention a novel type of syringe has been developed having therein a disc of ceramic or other material having an infinite impedance to the flow of mercury and a low impedance to the flow of air or gas. By using such a stop and connecting the other end of the syringe tube to a partial vacuum a very exact amount of mercury may be drawn into the syringe and held there while the capillary needle tip of the device is moved from the reservoir of mercury and introduced into the device being constructed. The partial vacuum is then changed to a low pressure so as to eject the mercury.

With such a device as a tool an unskilled worker may exceed the skill of a highly trained laboratory technician with a result that great uniformity in the production of the manufactured devices may be attained.

The essentially novel feature of the invention is the use of a stop of material having air passages therethrough of such very small dimensions that the surface tension of the fluid or the mercury prohibits the formation of particles small enough to thread their way therethrough.

A feature of the invention may be otherwise described as a syringe having therein a foraminous guard to limit the amount of liquid drawn therein to a definite amount and terminating in a capillary tube similar to the conventional hypodermic needle.

The drawings consist of a single sheet having six figures as follows:

Fig. 1 is an enlarged view partly broken away and shown in section of a syringe embodying the features of the present invention;

Fig. 2 is a view showing how an operator first fills the syringe with liquid and then ejects the liquid into a device;

Fig. 3 is an enlarged view with the device shown in cross-section illustrating the manner in which a fine needle used as the nozzle of the syringe may be inserted into the tubulation of an electronic device;

Fig. 4 is a schematic view showing how an operator may control the pressures for operating the syringe;

Fig. 5 is an enlarged view partly in section of a wafer of foraminous material; and Fig. 6 is a diagram used in the explanation of the mathematics dealing with the surface tension of the mercury.

The operation of the device of the present invention depends upon the formation and qualities of a formainous barrier. This may take the form of a ceramic filter having very fine passages therethrough and which will, by reason of the fineness of these passages, offer an infinite impedance to the flow of mercury but a low impedance to the flow of gas. For proper operation the holes in the barrier must be small enough to prevent the passage of mercury with the air pressure used.

A criterion for the maximum size of these holes is obtained from the general surface tension formula $$\Delta p = T\left(\frac{1}{R_1} + \frac{1}{R_2}\right) \qquad (1)$$

where $\Delta p$ is the differential pressure across a liquid surface, in dynes/cm.$^2$, $T$ is the surface tension of the liquid, about 450 dynes/cm. for mercury, $R_1$ and $R_2$ are principal radii of curvature of the liquid surface. To apply this criterion to the present case assume a tube of radius $R_t$ inserted in mercury with a differential pressure $\Delta p$ tending to force the mercury into the tube. The mercury surface will then assume a spherical form, with a radius defined by (see Fig. 6)

$$R_m = \frac{2T}{\Delta p} \qquad (2)$$

as $R_1 = R_2 = R_m$ in this case.

A condition of equilibrium between the applied pressure and surface tension is illustrated by the surface S, which rests against the end of the tube with an angle $\theta$, as shown, to the inside wall. It is defined by:

$$R_t = -R_m \sin(\theta - \pi) \qquad (3)$$

When a free liquid surface is brought into contact with a solid surface, the angle between them assumes a value dependent on the degree of wetting of the liquid by the surface. This angle of contact, $\theta_0$, must be greater than the angle of Fig. 2 for the condition of equilibrium to exist. From (1) and (2) then, we obtain the condition for the maximum hole size to withstand a given pressure:

$$R_t < \frac{-2T \sin(\theta_0 - \pi)}{\Delta p} \qquad (4)$$

In the present case we would expect to use a $\Delta p$ corresponding to about 1 atmosphere or 40,000 dynes/cm.² For the materials which are satisfactory for this purpose and which have included "fritted" glass and sintered Alundum with a glass type binder, the contact angle is of the order of 90 degrees. For this value:

$$R_t < \frac{-2 \times 500 \times \sin(90° - 180°)}{400,000} = .0025 \text{ cm.}$$

It will thus appear that no drilled hole can be used for this purpose. From a practical standpoint the No. 60 drill which is the smallest generally used is .04 inch in diameter while the No. 80 drill considered to be extremely fine is still .0135 inch in diameter.

In the practical application of these considerations a ceramic disc 1 made of sintered Alundum is attached or cemented to the end of a portion of a conventional hypodermic syringe 2 which has been cut off at a point where a predetermined capacity may be had. The device thus formed is covered with a rubber tube 3 which may be connected to a conventional pressure system as indicated in Fig. 4. This pressure system consists of a pump 4 continuously running which will exhibit a suction in the pipe 5 and a pressure in the pipe 6. The pipe 5 is connected by a capillary 7 to the hose 3. The pipe 6 extends to a valve 8 which may be operated by an operator's foot to connect the pressure to the pipe 9. When this occurs the pressure sufficiently overcomes the suction through the action of the capillary 7 to eject any mercury which may be in the syringe. The pump 4 is a commercially available rotary pump constructed and arranged to produce a small difference in pressure between its intake pipe 5 and its exhaust pipe 6 and the valve 8 is a conventional means for establishing connection between the normally closed pipe 9 and the normally closed pipe 6.

In operation, the operator will dip the capillary tube nozzle or needle 10 of the device into a pool of mercury as shown in Fig. 2 and since there is a suction connected thereto, mercury will be drawn into the syringe up to the limit of its capacity as defined by the foraminous barrier 1. The device is then transported by hand and the needle of the syringe is inserted into the tubulation 11 of a device into which mercury must be placed. As shown in Fig. 3, the needle 10 fits snugly into the tubulation 11 of the device defined by its envelope 12 and the tip thereof extends just beyond the end of this tubulation so that when the operator presses his foot on the valve 8 the mercury will be ejected into the device without clogging this tubulation. The needle 10 may be made the proper length so that when this needle is inserted into the tubulation 11 the collar 13 of the needle forms a stop against the end of the metal tube 11.

It may be noted that other variations of this arrangement may be used. The pressures in the system connected to the pump 4 may be reversed so that normally there will be a pressure on the syringe so that when it is not filled with mercury it may be blowing air outwardly in order to keep the syringe free from dust. With such an arrangement the operator will place his foot on the pedal after the needle 10 has been inserted in the pool of mercury and hold this until the needle has been inserted in the metal tubulation 11.

With this arrangement a precisely predetermined volume of mercury may be placed within a device such as the contact unit 12 by an unskilled operator.

What is claimed is:

1. A mercury dispensing apparatus comprising an open-ended tubular glass chamber, a thin sintered Alundum barrier having a plurality of holes therethrough fixed to the inner walls of said chamber at an angle normal to the longitudinal axis of said chamber, said barrier being non-wettable by mercury and pervious to air, the holes of said barrier having a maximum diameter of .0025 centimeter, a hollow tubular needle fixed to one end of said chamber, said barrier being spaced from said one end thereby forming, between said one end and said barrier, a measuring chamber, evacuating means attached to the other end of said chamber for partially evacuating said chamber and needle through said barrier holes whereby a precisely predetermined amount of mercury may be extracted from a reservoir of mercury by immersing said tubular needle therein, said extracted mercury thereby filling the inner volumes of said needle and said tubular glass chamber to said barrier but not the holes therein, and means for increasing the pressure applied through said barrier holes upon said extracted mercury mass whereby said extracted mercury can be caused to flow into a containing vessel.

2. A mercury dispensing apparatus comprising a chamber terminating at one end in a capillary tube, a thin sintered Alundum barrier having a plurality of holes therethrough and fixed to the inner walls of said chamber at an angle normal to the longitudinal axis of said chamber, said barrier being spaced from said one end thereby forming, between said one end and said barrier, a measuring chamber, said barrier being non-wettable by mercury and pervious to air, the holes of said barrier having a maximum diameter of .0025 centimeter, and air-pressure controlling means connected to the other end of said chamber.

JOHN T. L. BROWN.

REFERENCES CITED

The following references are of record in the file of this patent:

UNITED STATES PATENTS

| Number | Name | Date |
|---|---|---|
| 1,290,647 | Nyvall | Jan. 7, 1919 |
| 1,456,469 | Schwidetsky | May 22, 1923 |
| 1,685,666 | Brophy et al. | Sept. 25, 1928 |
| 2,157,596 | Davis | May 9, 1939 |
| 2,252,119 | Edmonds | Aug. 12, 1941 |
| 2,308,516 | Knott | Jan. 19, 1943 |
| 2,348,831 | Mathis | May 16, 1944 |
| 2,378,949 | Post | June 26, 1945 |
| 2,415,019 | McMahan | Jan. 28, 1947 |
| 2,423,173 | Brady et al. | July 1, 1947 |
| 2,430,078 | Reinsch et al. | Nov. 4, 1947 |